(12) United States Patent
Maeda et al.

(10) Patent No.: US 6,474,177 B2
(45) Date of Patent: Nov. 5, 2002

(54) FLOW MEASUREMENT DEVICE FOR MEASURING FLOW RATE AND FLOW VELOCITY

(75) Inventors: Shunsuke Maeda, Aichi (JP); Yoshihiko Kohmura, Aichi (JP); Takio Kojima, Aichi (JP); Yasuhisa Kuzuya, Aichi (JP); Masanori Suda, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/802,873

(22) Filed: Mar. 12, 2001

(65) Prior Publication Data

US 2001/0035054 A1 Nov. 1, 2001

(30) Foreign Application Priority Data

Mar. 13, 2000 (JP) .................................... 2000-069259

(51) Int. Cl.$^7$ ................................................ G01F 1/44
(52) U.S. Cl. .................................................. 73/861.63
(58) Field of Search ........................... 73/861.63, 118.2, 73/202, 204.11, 204.22, 202.13, 204.13

(56) References Cited

U.S. PATENT DOCUMENTS

| 4,100,801 A | 7/1978 | LeMay |
| 5,563,340 A | 10/1996 | Clowater et al. |
| 5,804,718 A | * 9/1998 | Nagasaka et al. ............. 73/202 |
| 5,942,683 A | 8/1999 | Aoi et al. |

FOREIGN PATENT DOCUMENTS

| DE | 198 00 573 A1 | 7/1999 |
| EP | 1091195 A1 | 4/2001 |
| JP | 58-120121 | 7/1983 |
| JP | 63-63937 | 3/1988 |
| JP | 8-145756 A | 6/1996 |
| JP | 8-271293 | 10/1996 |
| JP | 9-287991 | 11/1997 |
| JP | 9-329472 | 12/1997 |
| JP | 2000-310552 | 11/2000 |

OTHER PUBLICATIONS

European Search Report for EP 01 30 2997 dated Apr. 29, 2002.

* cited by examiner

*Primary Examiner*—Benjamin R. Fuller
*Assistant Examiner*—Jewel V. Thompson
(74) *Attorney, Agent, or Firm*—Sughrue Mion, PLLC

(57) ABSTRACT

A flow rate and flow velocity measurement device has a divided flow pipe (332) which is attached so as to be orthogonal to an intake pipe (1) of an engine, and into which a flow in the intake pipe (1) is introduced, an inlet plate (334) which extends in a direction orthogonal to a flow direction in the intake pipe (1) and forms a U-shape form pipe passage in the divided flow pipe (332) and a detection element (331) which is disposed so as to be exposed to a flow in the divided flow pipe (332) outside the intake pipe (1) and detects a flow rate and a flow velocity, wherein one end of the inlet plate (334) protrudes into the intake pipe (1) while passing a top opening of the divided flow pipe (332), and the divided flow pipe (332) has a flow passage structure symmetrical with the detection element (331) being made a center, so that an equivalent detection element (331) output is obtained in regard to both cases in which a fluid flows through the intake pipe (1) in a normal direction and a reverse direction.

18 Claims, 7 Drawing Sheets

FLOW MEASUREMENT DEVICE FOR MEASURING FLOW RATE AND FLOW VELOCITY

BACKGROUND OF THE INVENTION

1. Field of the Invention

The present invention relates to a device for measuring various quantities concerning a flow, especially, but not exclusively flow rate and flow velocity, among others, and relates to a flow rate and flow velocity measurement device sensitive to temperature and using a detection element integrally formed on a support body and/or a semiconductor chip, and also relates to a measurement device suitably applied, for example, as a combustion controlling mass flow rate sensor of an engine for a vehicle or industry, or a mass flow rate sensor for an industrial air conditioning system and compressor pressurized air supply system and, furthermore, an air/fuel ratio controlling sensor for a domestic gas hot-plate.

2. Description of the Related Art

Recently, in situations concerning an automobile (especially, four-wheeled), attention to the environment by emission regulation and the like is deemed to be highly important. In order to cope with this regulation and the like, an engine combustion control of a higher accuracy has become necessary. Therefore, various proposals have been made in regard to a flow passage structure of an engine combustion controlling mass flow rate sensor. For example, in Japanese Patent Laid-Open No. 271293/1996 Gazette, Japanese Patent Laid-Open No. 120121/1983 Gazette, Japanese Patent Laid-Open No. 329472/1997 Gazette and Japanese Patent Laid-Open No. 287991/1997 Gazette, there is proposed a measurement device intended to realize a high accuracy flow rate measurement by means of making it difficult less susceptible to an influence caused by pulsation of the engine by a structure in which a divided flow pipe is connected to an intake pipe of the engine to take in the measurement fluid and a flow rate measurement is performed in the divided flow pipe.

However, according to the structure of the measurement device proposed in each of the above gazettes, since a flow passage structure of the divided flow pipe is not formed symmetrically with a detection element being made a center, in situations where a reverse flow (flow from the engine toward the outside air) through the intake pipe occurs, it is considered difficult to accurately measure the flow rate.

SUMMARY OF THE INVENTION

Therefore, an object of the invention is to provide a flow rate and flow velocity measurement device capable of, in regard to both of a normal flow and a reverse flow, performing measurements of a flow rate and a flow velocity stably and with a high accuracy.

Taking also, for example, a two-wheel vehicle into account, the present inventors have presumed that, not only in the case where the engine pulsates and so the flow in an intake pipe pulsates but also in the case where a fluid in the intake pipe flows in a reverse direction, in future it will become necessary to accurately measure its flow rate in order to realize a more accurate flow rate measurement. Therefore, the inventors provide a flow rate and flow velocity measurement device described below.

According to a 1st aspect, the invention provides a measurement device having: a divided flow pipe which has a divided flow pipe passage basically curved in U-shape form, and into which a flow in a main flow pipe, that is a detection object, is introduced; and a detection element which is disposed so as to be exposed to the flow in the divided flow pipe, and detects a quantity concerning the flow; wherein the divided flow pipe has a flow passage structure symmetrical with the detection element being made a center such that both of a normal flow flowing in a predetermined direction in the main flow pipe and a reverse flow flowing in a direction reverse to the normal flow can be equivalently (preferably, in the same level) detected.

In this manner, by forming the divided flow pipe so as to have the flow passage structure symmetrical with the detection element being made a center, i.e., by forming a divided flow passage shape into a structure symmetrical to a main flow direction in the main flow pipe with the detection element being made a center, since it is possible to accurately measure a flow rate and the like of both of the normal flow and the reverse flow and, further, since a sensor output equivalent to the normal flow is obtained in regard also to the reverse flow, this sensor output may not be compensated depending on whether a flow of the main flow M is the normal flow or the reverse flow. Accordingly, a control circuit and the like for compensating the sensor output in compliance with the flow direction become unnecessary, so that a miniaturization and an electric power saving of a sensor assembly are made possible.

Further, according to a 2nd aspect based on the aforesaid 1st aspect, the invention provides a flow rate and flow velocity measurement device having flow control means which is provided in the divided flow pipe, and forms such a flow as obliquely impinges against a detection face of the detection element.

According to such a flow control means, a flow to be detected is constantly supplied to the detection face of the detection element, so that it is considered that it follows that the flow to be detected surely flows on the detection face. In addition, in the vicinity of the detection face, since a generation of a turbulence, e.g., generations of a vortex flow and an exfoliation, is suppressed, it is considered that a detection accuracy and a reproducibility are improved.

According to a 3rd aspect, the invention provides a flow rate and flow velocity measurement device having: a divided flow pipe into which a flow in a main flow pipe, that is a detection object, is introduced; an inlet plate which basically extends in a direction basically orthogonal to a flow direction in the main flow pipe, and forms a divided flow pipe passage basically curved in U-shape form in the divided flow pipe; and a detection element which is disposed so as to be exposed to the flow in the divided flow pipe, and detects a quantity concerning the flow; wherein: one end of the inlet plate protrudes into the main flow pipe while passing through a top opening of the divided flow pipe such that the flow (irrespective of a normal flow and a reverse flow) in the main flow pipe is taken into the divided flow pipe passage; and the divided flow pipe has a flow passage structure symmetrical with the detection element being made a center.

According to this measurement device, by protruding the inlet plate into a main flow pipe passage, since it is possible to generate a measurement flow toward the detection element, the measurement device, among others a structure of the divided flow pipe, is greatly simplified or miniaturized. Especially, this measurement device is suitable as a measurement device concerning a flow in case where the main flow pipe is small in its diameter and/or in case where it is necessary to suppress a pressure loss to minimum. Further, in this measurement device, since the flow passage structure in the divided flow pipe is simplified, it is considered that an analysis of the flow is easy.

Other aspects and characteristics of the invention are set forth in each claim and, with its citation, a repetitionary description is omitted. Therefore, it is deemed that each characteristic of each claim is set forth here. Incidentally, a dependent claim can be applied respectively to each independent claim so long as it is not contrary to a principle of the invention set forth in each independent claim and, further, the dependent claim can be applied to another dependent claim.

Hereunder, preferred implementation modes of the invention are explained. In the preferred implementation mode of the invention, in order to realize a stabilized high accuracy measurement, a bypass flow passage short-circuiting between an inlet port and an outlet port of the divided flow pipe is added and/or a Venturi for throttling the divided flow pipe passage in the vicinity of the detection element is annexed. By the above bypass flow passage, a measurement fluid supply to the detection element is stabilized and, further, the measurement fluid (flow in the main flow pipe) becomes easy to be taken into the divided flow pipe. Further, by the above Venturi, on the detection face of the detection element, it is possible to effectively remove the turbulence of the measurement fluid. Thus, by these bypass flow passage and Venturi, in regard to both of the normal flow and the reverse flow, a measurement is stabilized and, further, a high accuracy measurement becomes possible.

Especially, in case where the flow passage structure of the divided flow pipe is formed symmetrically with the detection element being made a center like the invention, by providing an orifice reducing the above bypass flow passage or a flow sectional diameter of the bypass flow passage, it is possible to intend to further stabilize the flow reaching the detection element in regard to both of the normal flow and the reverse flow.

In the preferred implementation mode of the invention, the orifice is provided in the above bypass flow passage, and a flow rate of the measurement fluid toward the detection element is set by a protrusion amount of a flow passage wall forming the orifice or an orifice open area. By this, it is possible to quantitatively control the flow rate toward the detection element.

In the preferred implementation mode of the invention, in the divided flow pipe, there is provided means for forming such a flow as obliquely impinges against a detection face of the detection element. By this flow control means, the flow to be detected is constantly supplied to the detection face of the detection element, so that it is considered that it follows that the flow to be detected surely flows on the detection face. In addition, since generations of vortex flow and exfoliation in the vicinity of the detection face are suppressed, it is considered that a detection accuracy and a reproducibility are improved.

In the preferred implementation mode of the invention, as the flow control means for forming a down flow, i.e., a flow obliquely impinging against the detection face of the detection element or a flow flowing obliquely with respect to the detection face, there is provided a flow passage face (protuberance) protruding than the detection face in at least an upstream or an upstream and/or a downstream of the detection element. As a form of the above protrusion, one capable of forming the flow obliquely impinging against the detection face suffices and, preferably, it is protruded concavely or convexly or its protruding surface is made a linear, polygonal or concave curved form slant face.

In the preferred implementation mode of the invention, in a curved portion of the divided flow pipe (detection pipe), the detection face of the detection element is exposed inside the divided flow pipe. Further preferably, a curved pipe (divided flow pipe) is attached in a direction orthogonal to the main flow pipe (measurement object pipe), and the detection element is provided in this curved portion (folded portion, a portion where the flow passage is curved) of the divided flow pipe. Alternatively, the detection element is disposed in a portion where the flow in the divided flow pipe is inverted or a portion where the flow direction is sharply changed or its vicinity. Also preferably, the detection face of the detection element is exposed to a portion where the flow in the divided flow pipe is speedy. Also preferably, the detection face of the detection element is exposed to a portion where the flow is throttled and subsequently changed in its direction in the divided flow pipe or its vicinity.

In the preferred implementation mode of the invention, the detection element attached to a bottom wall of the divided flow pipe is positioned outside the main flow pipe. By this, an attachment and an exchange of the detection element become easy, and also it becomes easy to take out an output of the detection element.

In the preferred implementation mode of the invention, such a detection element as mentioned below is used. That is, this detection element is one in which basically four thin film resistors are provided in a semiconductor chip. More concretely, a diaphragm portion and a rim portion are provided on a semiconductor layer. In the diaphragm portion, there are provided (1) an upstream temperature sensor, (2) a downstream temperature sensor, and (3) a heater disposed between the upstream temperature sensor. On the other hand, in the rim portion, there is provided (4) an atmosphere temperature sensor. The diaphragm portion is made very thin and a heat insulation is intended.

Next, a principle of detecting various quantities concerning a flow such as flow velocity and flow rate by using this detection element is shown.

(1) An electric power supplied to the heater is controlled such that the heater has a constant temperature difference with respect to an atmosphere temperature.

(2) Accordingly, in case where there is no flow, temperatures of the upstream temperature sensor and the downstream temperature sensor are approximately the same.

(3) However, in case where there is the flow, the temperature of the upstream temperature sensor descends because a heat escapes from its surface. As to the temperature of the downstream temperature sensor, since a heat input from heater increases, a temperature change is smaller than that of the upstream temperature sensor. Incidentally, there is also a case where the temperature of the downstream temperature sensor ascends.

(4) On the basis of a temperature difference between the upstream temperature sensor and the downstream temperature sensor, the flow rate and the flow velocity etc. are detected and, from a sign of the temperature difference, a flow direction is detected. Incidentally, the above temperature difference can be detected on the basis of a change in electrical resistance by the temperature.

In the preferred implementation mode of the invention, it is one for, on the basis of temperature, measuring the quantity concerning a flow, at least including a flow rate and/or a flow velocity by the detection element.

In the preferred implementation mode of the invention, the measurement device according to the invention is installed in an intake system of engine of various vehicles, and can be applied to a measurement of intake quantity etc. of the engine mounted on a two-wheel or four-wheel vehicle. For example, the measurement device according to the invention can be installed between an air cleaner and a throttle valve in the intake system of engine mounted on the four-wheel vehicle. Further, the measurement device according to the invention can be attached, in the intake system of an engine mounted on the two-wheel vehicle, to a two-wheel vehicle intake pipe (air funnel) connected to a cylinder in order to measure a flow rate or a flow velocity etc. of the intake.

DESCRIPTION OF THE PREFERRED EMBODIMENTS

In order to make the preferred implementation modes of the invention explained above more clear, embodiments of the invention will be explained below, by way of example only, with reference to the drawings.

Figure 1:
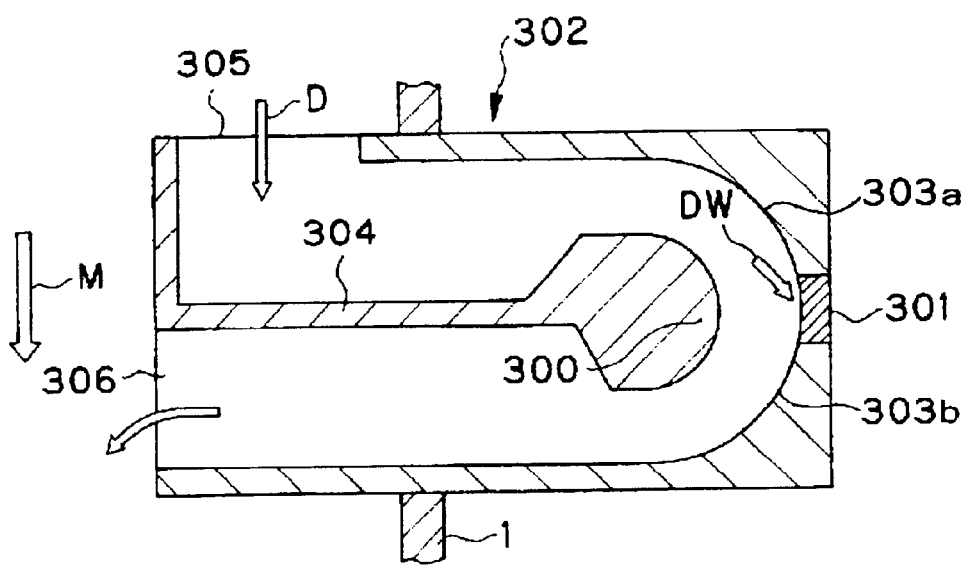
FIG. 1(A) is an explanatory view of a measurement device of a Reference example, and (B) an explanatory view of a measurement device of an Embodiment 1 of the invention, wherein each shows a longitudinal section cut along an axis direction of a main flow pipe.
Figure 1:
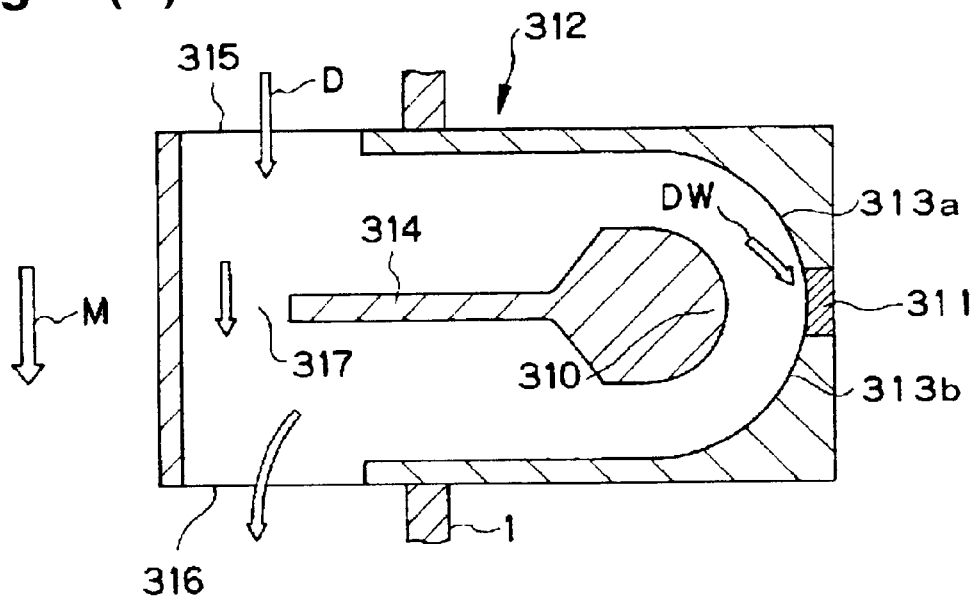
Figure 2:
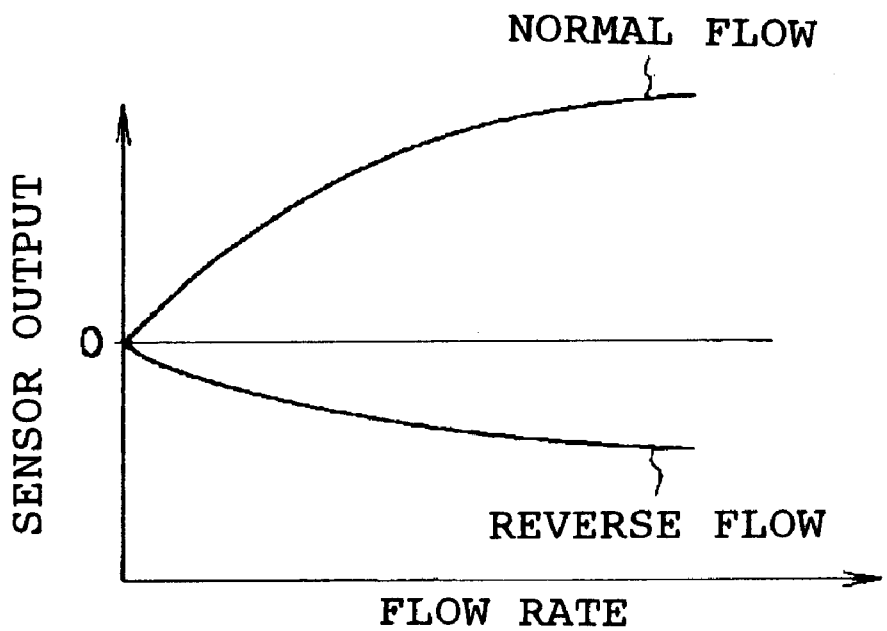
FIG. 2(A) is a graph showing flow rate—sensor (detection element) output characteristics of the measurement device of the Reference Example shown in FIG. 1(A), and FIG. 1(B) that showing flow rate—sensor (detection element) output characteristics of the measurement device of the Embodiment 1 shown in FIG. 1(B).
Figure 2:
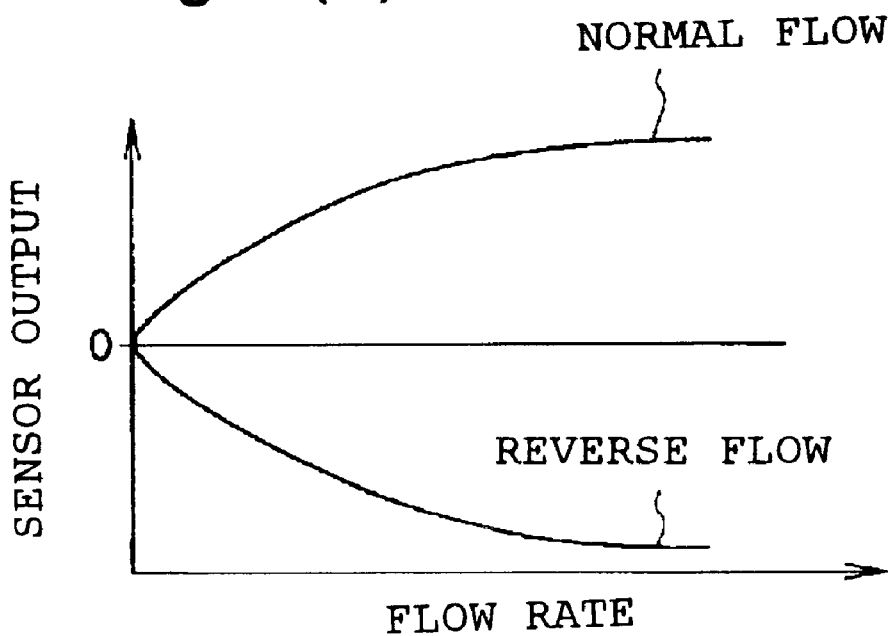

FIG. 1(A) is an explanatory view of a measurement device of a Reference example, and FIG. 1(B) an explanatory view of a measurement device of an Embodiment 1 of the invention. FIG. 2(A) is a graph showing flow rate—sensor (detection element) output characteristics of the device of the Reference Example shown in FIG. 1(A), and FIG. 2(B) that showing flow rate—sensor (detection element) output characteristics of the device of the Embodiment 1 shown in FIG. 1(B).

First, a structure of the measurement device of the Reference example is explained by referring to FIG. 1(A). Within a main pipe 1, a main flow M which is a measurement object is flowing. In a pipe wall of the main flow pipe 1, a divided flow pipe 302 is mounted orthogonally to a pipe axis direction of the main pipe 1 so as to be able to take in a divided flow D separated from the main flow M. Within the divided flow pipe 302, a divided flow pipe passage curved approximately in U-shape form is formed by an inlet plate 304 (main separator) extending in a direction approximately orthogonal to a flow direction (main flow pipe 1 pipe axis direction) of the main flow M. An inlet port(becoming also an outlet port) 305 opening in a face approximately orthogonal to the flow direction of the main flow M is formed in one end of an outer periphery wall of the divided flow pipe 302, and an outlet port (becoming also an inlet port) 306 opening in a face approximately parallel to the flow direction of the main flow M is formed in the other end of a top outer wall, of the divided flow pipe 302, extending along the main pipe 1 pipe axis direction. One end of the inlet plate 304 is continuous with a top outer wall of the divided flow pipe 302. In the other end of the inlet plate 304, a Venturi 300 of asymmetrical structure is formed so as to throttle the divided flow pipe passage. In a bottom wall of the divided flow pipe 302, a detection element 301 is provided so as to face a curved portion outer periphery side of the divided flow pipe passage and be opposite to a convex curved face of the Venturi 300 while putting a narrowest portion of the divided flow pipe passage between them. In a flow passage wall on both sides of the detection element 301, there are formed protuberances 303a, 303b inwardly protruding toward the divided flow pipe passage. By such a flow passage structure, a measurement fluid introduced by the inlet plate 304 into the divided flow pipe passage, in which the detection element 301 exists, passes on the detection element 301 facing the narrowest portion of the divided flow pipe passage while being throttled. By this, a down flow DW obliquely flowing toward a detection face of the detection element 301 is formed and, on the detection face, a turbulence of the measurement fluid is reduced.

The divide flow pipe passage of the measurement device of the Reference Example explained above has an asymmetrical structure along its flow direction and, further, also the inlet port 305 and the outlet port 306 are not formed symmetrically. Therefore, referring to FIG. 2(A), there is a difference in sensor output characteristics of the detection element 301 between a case where the main flow M flows in a direction shown in FIG. 1(A) (this is assumed to be "normal flow") and the divided flow D is introduced from the inlet port 305 to be taken out from the outlet port 306, and a case where the main flow M flows in a direction reverse to the direction shown in FIG. 1(A) (this is assumed to be "reverse flow") and the divided flow D is introduced from the outlet port 306 to be taken out from the inlet port 305. That is, for the same flow rate, it follows that there is a difference in magnitude of sensor output between the case of the normal flow and the case of reverse flow. Accordingly, in order to ask for an accurate flow rate, in regard to either the normal flow or the reverse flow, it is necessary to compensate the sensor output.

Embodiment 1

Next, a structure of a measurement device of the Embodiment 1 of the invention is explained by referring to FIG. 1(B). Within a main pipe 1, the main flow M which is a measurement object is flowing. In the pipe wall of the main flow pipe 1, a divided flow pipe 312 is mounted orthogonally to the pipe axis direction of the main pipe 1 so as to be able to take in the divided flow D separated from the main flow M. Within the divided flow pipe 312, the divided flow pipe passage curved approximately in U-shape form is formed by an inlet plate 314 (main separator) extending in a direction approximately orthogonal to the flow direction (main flow pipe 1 pipe axis direction) of the main flow M. An inlet port (becoming also an outlet port) 315 opening in a face approximately orthogonal to the flow direction of the main flow M is formed in one end of an outer periphery wall of the divided flow pipe 312, and an outlet port (becoming also an inlet port) 316 opening in a face approximately orthogonal to the flow direction of the main flow M is formed in the other end of the outer periphery wall of the divided flow pipe 312 so as to be opposite to the inlet port 315. One end of the inlet plate 314 is spaced from a top outer wall of the divided flow pipe 312. A bypass flow passage 317 short-circuiting between the inlet port 315 and the outlet port 316 is formed between the inlet plate 314 one end and the divided pipe 312 top outer wall. In the other end of the inlet plate 314, a Venturi 310 of symmetrical structure is formed so as to throttle the divided flow pipe passage. In a bottom wall of the divided flow pipe 312, a detection element 311 is provided so as to face a curved portion outer periphery side of the divided flow pipe passage and be opposite to a convex curved face of the Venturi 310 while putting a narrowest portion of the divided flow pipe passage between them. In a flow passage wall on both sides of the detection element 311, there are formed protuberances 313a, 313b inwardly protruding toward the divided flow pipe passage. By such a flow passage structure, the measurement fluid introduced by the inlet plate 314 into the divided flow pipe passage, in which the detection element 311 exists, passes on the detection element 311 facing the narrowest portion of the divided flow pipe while being throttled. By this, the down flow DW obliquely flowing toward a detection face of the detection element 311 is formed and, on the detection face, the turbulence of the measurement fluid is reduced.

The divided flow pipe passage of the measurement device of the Embodiment 1 explained above has a symmetrical structure along its flow direction and, further, also the inlet port 315 and the outlet port 316 are formed symmetrically. Therefore, referring to FIG. 2(B), sensor output characteristics of the detection element 311 are similar in a case where the main flow M flows in the normal flow direction shown in FIG. 1(B) and the divided flow D is introduced from the inlet port 315 to be taken out from the outlet port 316, and a case where the main flow M flows in the reverse flow direction and the divided flow D is introduced from the outlet port 316 to be taken out from the inlet port 315. That is, for the same flow rate, sensor outputs of similar magnitude occur in the case where the normal flow flows and the case where the reverse flow flows. Accordingly, when asking for the accurate flow rate, it is unnecessary to compensate the sensor output in dependence on whether the flow of the main flow is the normal flow or the reverse flow.

A further advantage of the measurement device of this Embodiment 1 is explained by referring to FIG. 1(B) again. The bypass flow passage 317 formed between the inlet plate 314 and the top outer wall has a function of orifice. The flow having passed through this bypass flow passage 317 is accelerated in a portion whose flow section diameter is small (this is referred to as "orifice portion") and functions so as to effectively draw out the measurement fluid joining approximately perpendicularly to this flow, i.e., the measurement flow having passed on the detection element 311, toward the outlet port 316. Further, by controlling an open area of this orifice portion, it is possible to easily control a quantity of the measurement fluid flowing onto the detection element 311.

Consecutively, as the measurement devices of Embodiments 2 to 7 of the invention, there are explained examples of the measurement devices which have the structure in which the divided flow pipe passage is symmetrical along its flow direction like the measurement device of the aforesaid Embodiment 1, in which the inlet port and the outlet port are symmetrically formed and which bring about the equivalent flow rate—sensor (detection element) output characteristics irrespective of the main flow direction in the main flow pipe, i.e., irrespective of whether it is the normal flow or the reverse flow.

First, as examples of the measurement device having no bypass flow passage short-circuiting between the inlet port and the outlet port, the measurement devices of the Embodiments 2 and 3 of the invention are explained.

Embodiment 2

Figure 3:
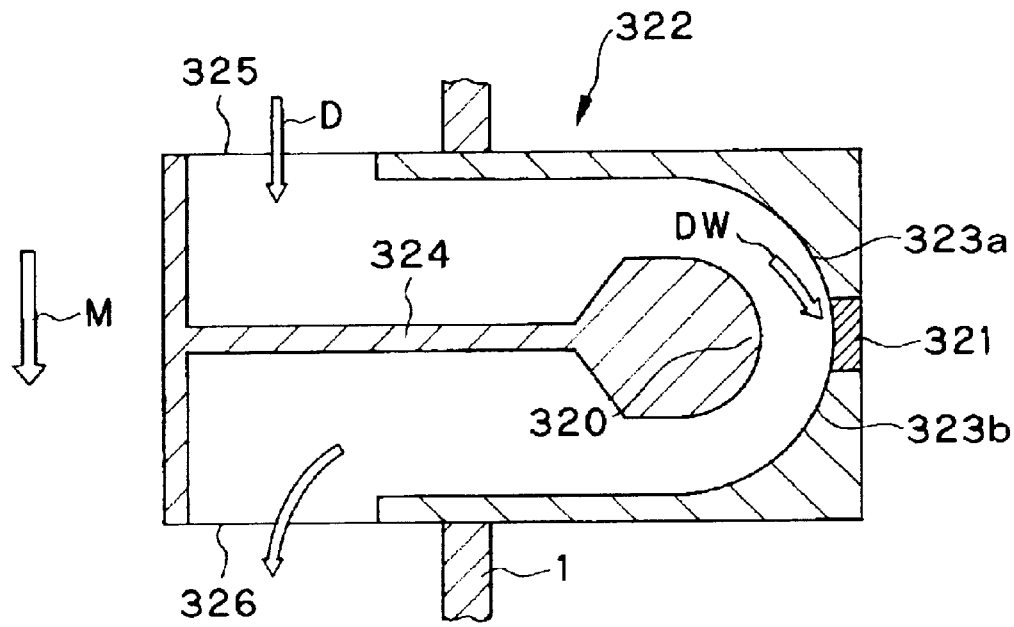
FIG. 3 is an explanatory view of a measurement device of an Embodiment 2 of the invention, and shows the longitudinal section cut along the axial direction of the main flow pipe.

FIG. 3 is an explanatory view of the measurement device of the Embodiment 2 of the invention. Referring to FIG. 3, within the main pipe 1, the main flow M which is a measurement object is flowing. In the pipe wall of the main flow pipe 1, a divided flow pipe 322 is mounted so as to be able to take in the divided flow D. Within the divided flow pipe 322, the divided flow pipe passage curved approximately in U-shape form is formed by an inlet plate 324 (main separator) extending in a direction approximately orthogonal to the flow direction (main flow pipe 1 pipe axis direction) of the main flow M. An inlet port (becoming also an outlet port) 325 opening in a face approximately orthogonal to the flow direction of the main flow M is formed in one end of an outer periphery wall of the divided flow pipe 322, and an outlet port (becoming also an inlet port) 326 opening in a face approximately orthogonal to the flow direction of the main flow M is formed in the other end of the outer periphery wall of the divided flow pipe 322 so as to be opposite to the inlet port 325. One end of the inlet plate 324 is continuous to a top outer wall of the divided flow pipe 322. In the other end of the inlet plate 324, a Venturi 320 of symmetrical structure is formed so as to throttle the divided flow pipe passage. In a bottom wall of the divided flow pipe 322, a detection element 321 is provided so as to face the curved portion outer periphery side of the divided flow pipe passage and be opposite to a convex curved face of the Venturi 320 while putting the narrowest portion of the divided flow pipe passage between them. In a flow passage wall on both sides of the detection element 321, there are formed protuberances 323a, 323b inwardly protruding toward the divided flow pipe passage. By such a flow passage structure, the measurement fluid introduced by the inlet plate 324 into the divided flow pipe passage, in which the detection element 321 exists, passes on the detection element 321 facing the narrowest portion of the divided flow pipe passage while being throttled. By this, the down flow DW obliquely flowing toward a detection face of the detection element 321 is formed and, on the detection face, the turbulence of the measurement fluid is reduced.

Embodiment 3

Figure 4:
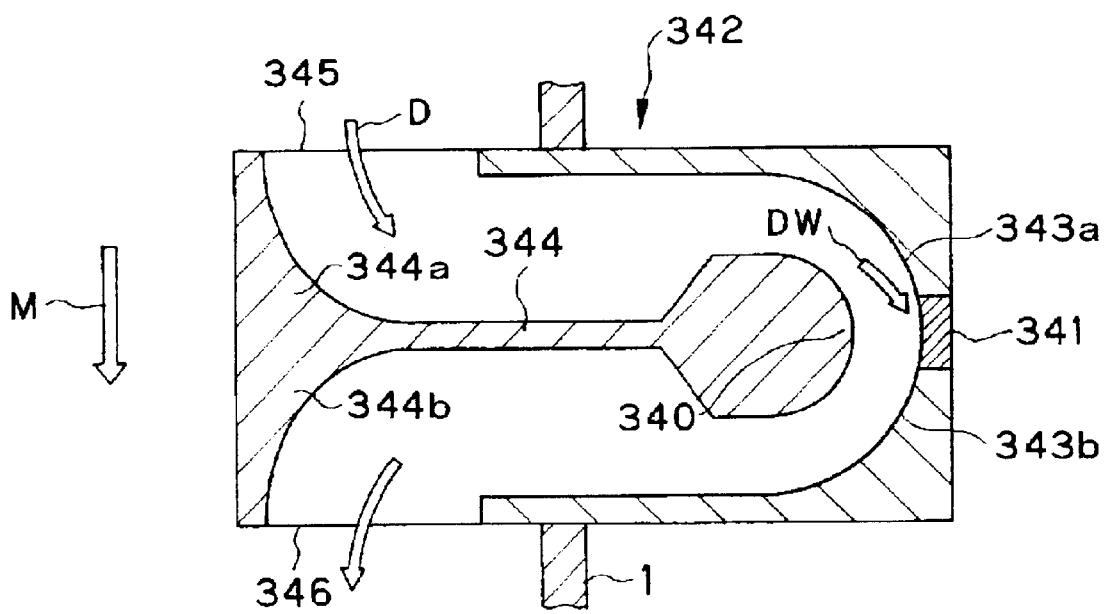
FIG. 4 is an explanatory view of a measurement device of an Embodiment 3 of the invention, and shows the longitudinal section cut along the axial direction of the main flow pipe.

FIG. 4 is an explanatory view of the measurement device of the Embodiment 3 of the invention. Referring to FIG. 4, within the main pipe 1, the main flow M which is a measurement object is flowing. In the pipe wall of the main flow pipe 1, a divided flow pipe 342 is mounted so as to be able to take in the divided flow D. Within the divided flow pipe 342, the divided flow pipe passage curved approximately in U-shape form is formed by an inlet plate 344 (main separator) extending in a direction approximately orthogonal to the flow direction (main flow pipe 1 pipe axis direction) of the main flow M. An inlet port (becoming also an outlet port) 345 opening in a face approximately orthogonal to the flow direction of the main flow M is formed in one end of an outer periphery wall of the divided flow pipe 342, and an outlet port (becoming also an inlet port) 346 opening in a face approximately orthogonal to the flow direction of the main flow M is formed in the other end of the outer periphery wall of the divided flow pipe 342 so as to be opposite to the inlet port 345. One end of the inlet plate 344 is enlarged along the pipe axis direction (main flow direction) of the main flow pipe 1 and continuous to the top outer wall of the divided flow pipe 342. Thus, in FIG. 4, at the downside of the inlet port 345 and the upside of the outlet 346, in one end both sides (inner periphery side flow passage walls) of the inlet plate 344 forming the divided flow pipe passage there are respectively formed undulation portions 344a, 344b undulating so as to have flow passage faces of concave curved face form and throttle the divided flow pipe passage. By this, a pipe passage in outlet/inlet portions of the divided flow pipe passage is throttled, so that the flow of the measurement fluid toward a detection element 341 is adjusted. In the other end of the inlet plate 344, a Venturi 340 of symmetrical structure is formed so as to throttle the divided flow pipe passage. In a bottom wall of the divided flow pipe 342, the detection element 341 is provided so as to face the curved portion outer periphery side of the divided flow pipe passage and be opposite to a convex curved face of the Venturi 340 while putting the narrowest portion of the divided flow pipe passage between them. In a flow passage wall on both sides of the detection element 341, there are formed protuberances 343a, 343b inwardly protruding toward the divided flow pipe passage. By such a flow passage structure, the measurement fluid introduced by the inlet plate 344 into the divided flow pipe passage, in which the detection element 341 exists, passes on the detection element 341 facing the narrowest portion of the divided flow pipe passage while being throttled. By this, the down flow DW obliquely flowing toward a detection face of the detection element 341 is formed and, on the detection face, the turbulence of the measurement fluid is reduced.

According to the measurement devices of the Embodiments 2 and 3 explained above, by not providing the bypass flow pipe passage short-circuiting between the inlet port and the outlet port, since the flow passage structure in the divided flow pipe is simplified, it is considered easy to grasp a flow state.

Embodiment 4

Figure 5:
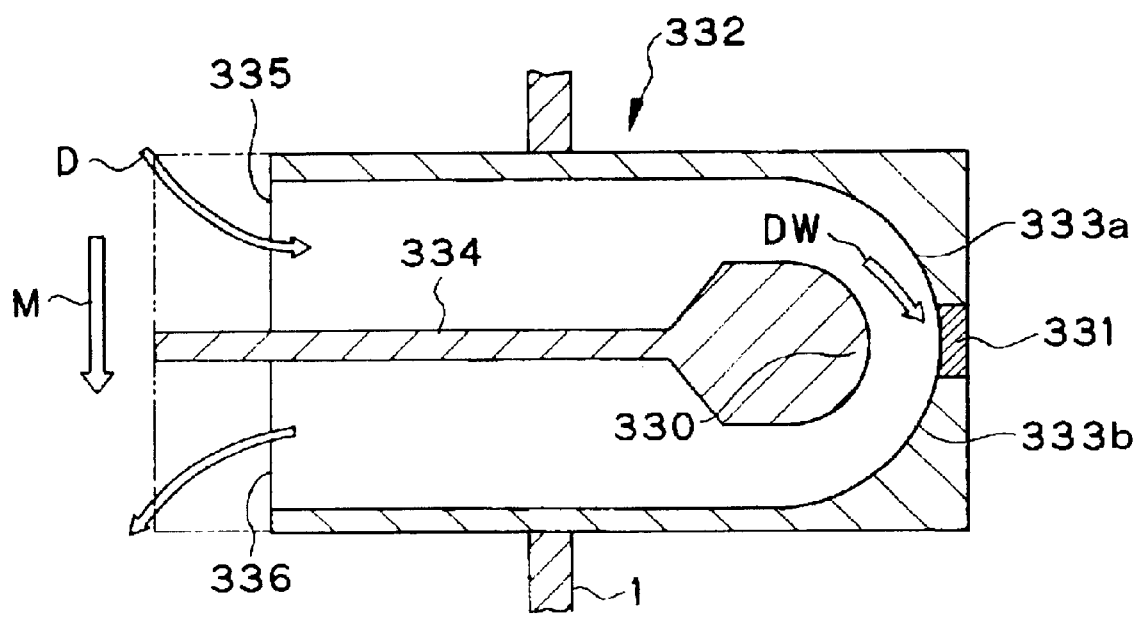
FIG. 5 is an explanatory view of a measurement device of an Embodiment 4 of the invention, and shows the longitudinal section cut along the axial direction of the main flow pipe.

Next, the measurement device of the Embodiment 4 of the invention, in which the top outer wall opposite to the inlet plate has been omitted is explained. FIG. 5 is an explanatory view of the measurement device of the Embodiment 4 of the invention. Referring to FIG. 5, within the main pipe 1, the main flow M which is a measurement object is flowing. In the pipe wall of the main flow pipe 1, a divided flow pipe 332 is mounted so as to be able to take in the divided flow D. Within the divided flow pipe 332, the divided flow pipe passage curved approximately in U-shape form is formed by an inlet plate 334 (main separator) extending in a direction approximately orthogonal to the flow direction (main flow pipe 1 pipe axis direction) of the main flow M. A top of the divided flow pipe 332 is largely opened, and one end of the inlet plate 334 protrudes into the main flow pipe 1 from a center of this top opening. By this one end of the inlet plate 334, an inlet port (becoming also an outlet port) 335 and an outlet port (becoming also an inlet port) 336, which open in a face approximately parallel to the flow direction of the main flow M, are symmetrically partitioned/formed. The divided flow D is introduced into the divided flow pipe 332 from a direction oblique to the opening face (face approximately parallel to the flow direction of the main flow M) of the inlet port 335, and taken out into the main flow pipe 1 in a direction oblique to the opening face (face approximately parallel to the flow direction of the main flow M) of the outlet port 336. In case of the reverse flow, it is the reverse of this. In the other end of the inlet plate 334, a Venturi 330 of symmetrical structure is formed so as to throttle the divided flow pipe passage. In a bottom wall of the divided flow pipe 332, a detection element 331 is provided so as to face the curved portion outer periphery side of the divided flow pipe passage and be opposite to a convex curved face of the Venturi 330 while putting the narrowest portion of the divided flow pipe passage between them. In a flow passage wall on both sides of the detection element 331, there are formed protuberances 333a, 333b inwardly protruding toward the divided flow pipe passage. By such a flow passage structure, the measurement fluid introduced by the inlet plate 334 into the divided flow pipe passage, in which the detection element 331 exists, passes on the detection element 331 facing the narrowest portion of the divided flow pipe passage while being throttled. By this, the down flow DW obliquely flowing toward a detection face of the detection element 331 is formed and, on the detection face, the turbulence of the measurement fluid is reduced.

According to the measurement device of this Embodiment 4, since the measurement flow toward the detection element can be generated by protruding the inlet plate into the main flow pipe passage, a structure of the measurement device is greatly simplified or miniaturized. Especially, the measurement device of this Embodiment 4 is suitable as a measurement device concerning a flow in case where the main flow pipe is small in its diameter and/or in case where it is necessary to suppress a pressure loss to minimum. Further, according to the measurement device of this Embodiment 4, since the flow passage structure in the divided flow pipe is simplified, it is considered that an analysis of the flow is easy.

Next, the measurement devices of Embodiments 5 to 7 of the invention, each having the inlet plate in which the large Venturi is not formed in the other end thereof, i.e., the portion opposite to the detection element, are explained. Incidentally, in comparison with the divided flow pipe of the Embodiment 5, the divided pipe of the Embodiment 6 is different in a point that one end of the inlet plate is formed while being continuous to the divided flow pipe top outer wall, and the divided pipe of the Embodiment 7 is different in a point that one end of the inlet plate is formed while protruding from the divided flow pipe top opening, respectively from a structure of the divided flow pipe of the Embodiment 5.

Embodiment 5

Figure 6:
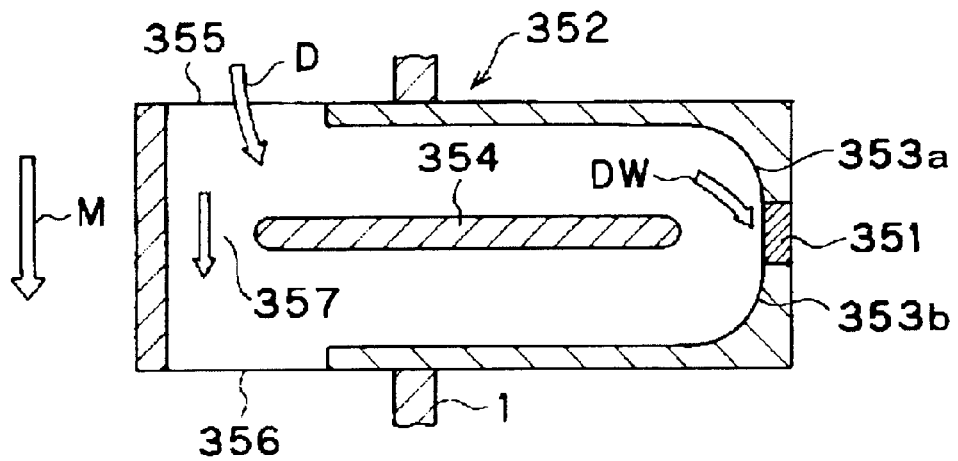
FIGS. 6(A) to (C) are explanatory views of the devices of Embodiments 5 to 7 of the invention in order, wherein each shows the longitudinal section cut along the axial direction of the main flow pipe.
Figure 6:
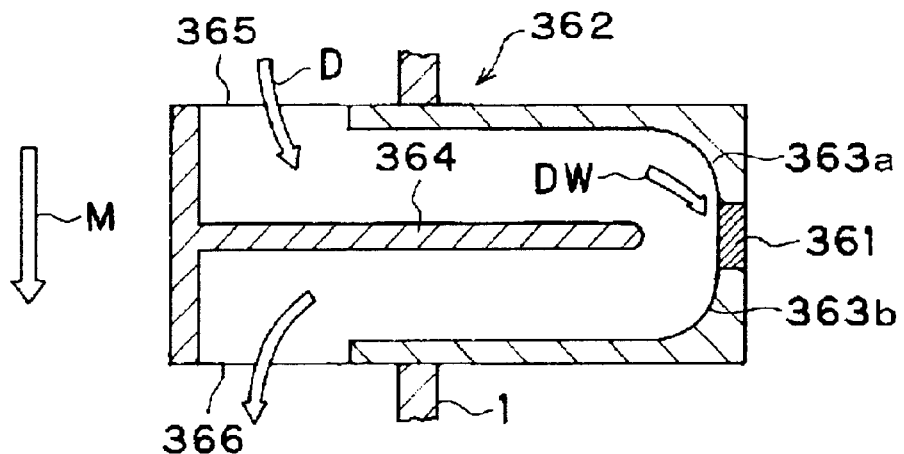
Figure 6:
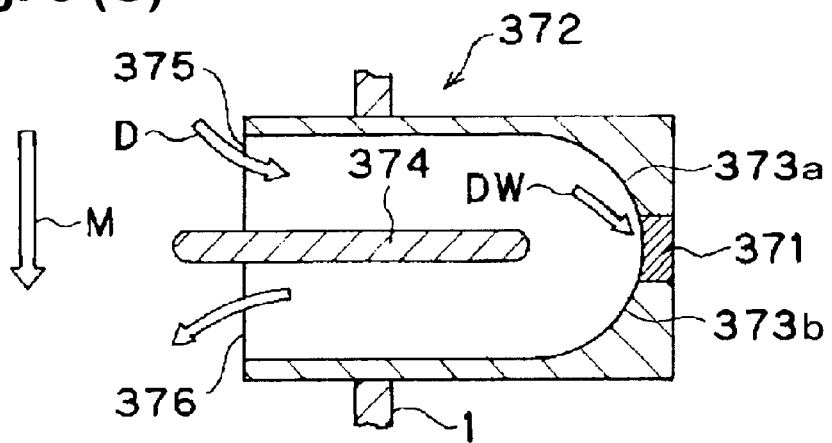

FIG. 6(A) is an explanatory view of the measurement device of the Embodiment 5 of the invention, and shows a longitudinal section cut along an axis direction of the main pipe. Referring to FIG. 6(A), within the main pipe 1, the main flow M which is a measurement object is flowing. In the pipe wall of the main flow pipe 1, a divided flow pipe 352 is mounted so as to be able to take in the divided flow D. Within the divided flow pipe 352, the divided flow pipe passage curved approximately in U-shape form is formed by an inlet plate 354 (main separator) extending in a direction approximately orthogonal to the flow direction (main flow pipe 1 pipe axis direction) of the main flow M. A thickness of the inlet plate 354 is approximately constant along its extending direction. An inlet port (becoming also an outlet port) 355 opening in a face approximately orthogonal to the flow direction of the main flow M is formed in one end of an outer periphery wall of the divided flow pipe 352, and an outlet port (becoming also an inlet port) 356 opening in a face approximately orthogonal to the flow direction of the main flow M is formed in the other end of the outer periphery wall of the divided flow pipe 352 so as to be opposite to the inlet port 355. One end of the inlet plate 354 is spaced from a top outer wall of the divided flow pipe 352. A bypass flow passage short-circuiting between the inlet port 355 and the outlet port 356 is formed between the inlet plate 354 one end and the divided pipe 352 top outer wall. In the other end of the inlet plate 354, a convex curved face protruding toward a detection element 351 is formed. In a bottom wall of the divided flow pipe 352, the detection element 351 is provided so as to face the curved portion outer periphery side of the divided flow pipe passage and be opposite to the convex curved face of the inlet plate 354 while putting the narrowest portion of the divided flow pipe passage between them. In a flow passage wall on both sides of the detection element 351, there are formed protuberances 353a, 353b inwardly protruding toward the divided flow pipe passage. By such a flow passage structure, the measurement fluid introduced by the inlet plate 354 into the divided flow pipe passage, in which the detection element 351 exists, passes on the detection element 351 facing the narrowest portion of the divided flow pipe passage while being throttled. By this, the down flow DW obliquely flowing toward a detection face of the detection element 351 is formed and, on the detection face, the turbulence of the measurement fluid is reduced. Further, by the fact that the bypass flow passage 357 is formed in the divided flow pipe 352 of the measurement device of this Embodiment 5, the measurement fluid having passed on the detection element 351 is effectively drawn out toward the outlet port 356.

Embodiment 6

FIG. 6(B) is an explanatory view of the measurement device of the Embodiment 6 of the invention, and shows a longitudinal section cut along an axis direction of the main pipe. Referring to FIG. 6(B), within the main pipe 1, the main flow M which is a measurement object is flowing. In the pipe wall of the main flow pipe 1, a divided flow pipe 362 is mounted so as to be able to take in the divided flow D. Within the divided flow pipe 362, the divided flow pipe passage curved approximately in U-shape form is formed by an inlet plate 364 (main separator) extending in a direction approximately orthogonal to the flow direction (main flow pipe 1 pipe axis direction) of the main flow M. A thickness of the inlet plate 364 is approximately constant along its extending direction. An inlet port (becoming also an outlet port) 365 opening in a face approximately orthogonal to the flow direction of the main flow M is formed in one end of an outer periphery wall of the divided flow pipe 362, and an outlet port (becoming also an inlet port) 366 opening in a face approximately orthogonal to the flow direction of the main flow M is formed in the other end of the outer periphery wall of the divided flow pipe 362 so as to be opposite to the inlet port 365. One end of the inlet plate 364 is continuous to a top outer wall of the divided flow pipe 362. In the other end of the inlet plate 364, a convex curved face protruding toward a detection element 361 is formed. In a bottom wall of the divided flow pipe 362, the detection element 361 is provided so as to face the curved portion outer periphery side of the divided flow pipe passage and be opposite to the convex curved face of the inlet plate 364 while putting the narrowest portion of the divided flow pipe passage between them. In a flow passage wall on both sides of the detection element 361, there are formed protuberances 363a, 363b inwardly protruding toward the divided flow pipe passage. By such a flow passage structure, the measurement fluid introduced by the inlet plate 364 into the divided flow pipe passage, in which the detection element 361 exists, passes on the detection element 361 facing the narrowest portion of the divided flow pipe passage while being throttled. By this, the down flow DW obliquely flowing toward a detection face of the detection element 361 is formed and, on the detection face, the turbulence of the measurement fluid is reduced.

Embodiment 7

FIG. 6(C) is an explanatory view of the measurement device of the Embodiment 7 of the invention, and shows a longitudinal section cut along an axis direction of the main pipe. Referring to FIG. 6(C), within the main pipe 1, the main flow M which is a measurement object is flowing. In the pipe wall of the main flow pipe 1, a divided flow pipe 372 is mounted so as to be able to take in the divided flow D. Within the divided flow pipe 372, the divided flow pipe passage curved approximately in U-shape form is formed by an inlet plate 374 (main separator) extending in a direction approximately orthogonal to the flow direction (main flow pipe 1 pipe axis direction) of the main flow M. A thickness of the inlet plate 374 is approximately constant along its extending direction. A top of the divided flow pipe 372 is largely opened, and one end of the inlet plate 374 protrudes into the main flow pipe 1 from a center of this top opening. By this one end of the inlet plate 374, an inlet port (becoming also an outlet port) 375 and an outlet port (becoming also an inlet port) 376, which open in a face approximately parallel to the flow direction of the main flow M, are partitioned/formed. The divided flow D is introduced into the divided flow pipe 372 from a direction oblique to the opening face (face approximately parallel to the flow direction of the main flow M) of the inlet port 375, and taken out into the main flow pipe 1 in a direction oblique to the opening face (face approximately parallel to the flow direction of the main flow M) of the outlet port 376. In case of the reverse flow, it is the reverse of this. In the other end of the inlet plate 374, a convex curved face protruding toward a detection element 371 is formed. In a bottom wall of the divided flow pipe 372, the detection element 371 is provided so as to face the curved portion outer periphery side of the divided flow pipe passage and be opposite to the convex curved face of the inlet plate 374 while putting the narrowest portion of the divided flow pipe passage between them. In a flow passage wall on both sides of the detection element 371, there are formed protuberances 373a, 373b inwardly protruding toward the divided flow pipe passage. By such a flow passage structure, the measurement fluid introduced by the inlet plate 374 into the divided flow pipe passage, in which the detection element 371 exists, passes on the detection element 371 facing the narrowest portion of the divided flow pipe passage while being throttled. By this, the down flow DW obliquely flowing toward a detection face of the detection element 371 is formed and, on the detection face, the turbulence of the measurement fluid is reduced. Further, similarly to the measurement device of the aforesaid Embodiment 4, in the measurement device of this Embodiment 7, by the fact that one end of the inlet plate 374 is protruding, since the measurement flow toward the detection element can be generated by a simple structure, the measurement device is greatly miniaturized. Especially, the measurement device of this Embodiment 7 is suitable as a measurement device concerning a flow in case where the main flow pipe is small in its diameter and/or in case where it is necessary to suppress a pressure loss to minimum. Further, according to the measurement device of this Embodiment 7, since the flow passage structure in the divided flow pipe is simplified, it is considered that an analysis of the flow is easy.

Next, in the measurement devices of the various embodiments of the invention, preferable partial constitutions are explained.

Figure 7:
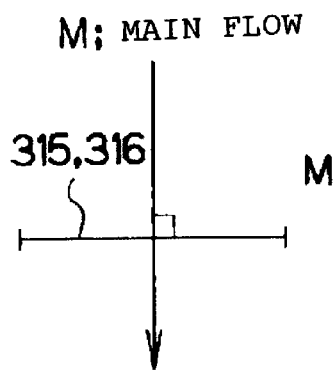
FIGS. 7(A) and (B) are explanatory views of a bypass flow passage short-circuiting between an inlet port and an outlet port like the measurement device of the Embodiment 1 of the invention shown in FIG. 1(B), wherein (A) is an operation explanatory view, and (B) a partial enlarged view of the bypass flow passage.
Figure 7:
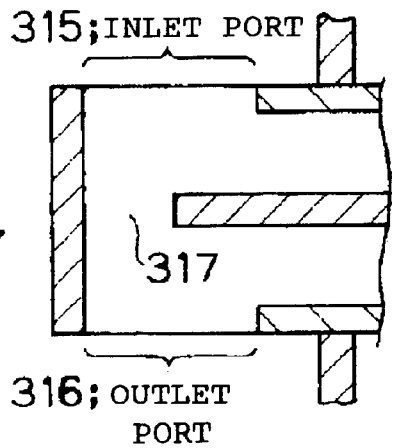

FIG. 7(A) and FIG. 7(B) are explanatory views of the bypass flow passage short-circuiting between the inlet port and the outlet port like the measurement device of the Embodiment 1 of the invention shown in FIG. 1(B), wherein FIG. 7(A) is an operation explanatory view, and FIG. 7(B) a partial enlarged view of the bypass flow passage.

Referring to FIG. 1(B) and FIG. 7(B) again, in the measurement device of the aforesaid Embodiment 1, the inlet port (becoming also an outlet port) 315 opening in a face approximately orthogonal to the flow direction of the main flow M is formed in one end of an outer periphery wall of the divided flow pipe, and the outlet port (becoming also an inlet port) 316 opening in a face approximately orthogonal to the flow direction of the main flow M is formed in the other end of the outer periphery wall of the divided flow pipe so as to be opposite to the inlet port 315. That is, by the fact that the inlet port 315 and the outlet port 316 are formed in such a mutual position as shown in FIG. 7(A), since a pollution substance whose density is relatively high passes through the bypass flow passage 317 and is discharged outside the divided flow pipe, an accumulation of the pollution substance onto the detection element positioned in the bottom wall of the divided flow pipe is suppressed.

Figure 8:
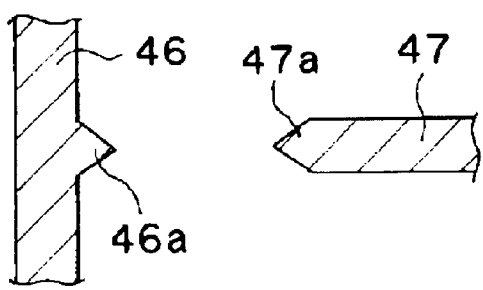
FIGS. 8(A) to (C) are partial views for explaining various Modification Examples of the measurement device of the embodiment of the invention, which has such a bypass flow passage as shown in FIGS. 1(B), wherein (A), (B) and (C) show orifices having respectively triangle form, curved face form and polygonal form protrusion.
Figure 8:
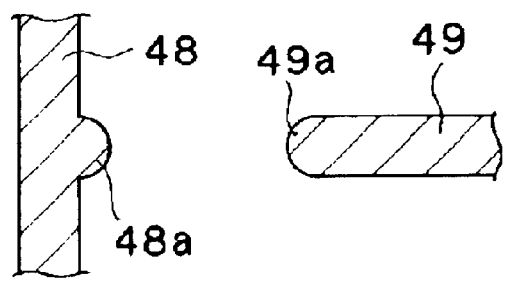
Figure 8:
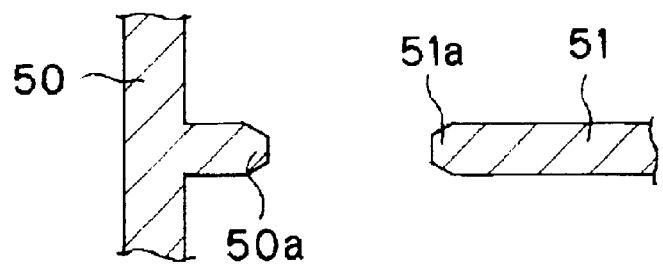

FIG. 8(A) to FIG. 8(C) are partial views for explaining various Modification Examples of the measurement device of one embodiment of the invention having such a bypass flow passage as shown in FIG. 1(B), wherein FIG. 8(A), FIG. 8(B) and FIG. 8(C) show orifices respectively having protrusions of triangle form, curved face form and polygonal form.

Referring to FIG. 8(A), in a bypass flow passage formed between a top outer wall 46 and an inlet plate 47 one end of the divided flow pipe, in the top outer wall 46 inside and the inlet plate 47 one end, protrusions 46a, 47a having flow passage faces of triangle form are respectively formed so as to be mutually opposite. By these protrusions 46a, 47a, an orifice reducing the bypass flow passage in its diameter is formed in the bypass flow passage.

Referring to FIG. 8(B), in a bypass flow passage formed between a top outer wall 48 and an inlet plate 49 one end of the divided flow pipe, in the top outer wall 48 inside and the inlet plate 49 one end, protrusions 48a, 49a having flow passage faces of curved face form are respectively formed so as to be mutually opposite. By these protrusions 48a, 49a, an orifice reducing the bypass flow passage in its diameter is formed in the bypass flow passage.

Referring to FIG. 8(C), in a bypass flow passage formed between a top outer wall 50 and an inlet plate 51 one end of the divided flow pipe, in the top outer wall 50 inside and the inlet plate 51 one end, protrusions 50a, 51a having flow passage faces of polygonal form are respectively formed so as to be mutually opposite. By these protrusions 50a, 51a, an orifice reducing the bypass flow passage in its diameter is formed in the bypass flow passage.

According to the measurement device having such an orifice as shown in FIG. 8(A) to FIG. 8(C) in the above, by adjusting an orifice diameter with respect to a flow sectional direction diameter of the bypass flow passage, it is possible to quantitatively control a measurement flow rate toward the detection face of the detection element. Further, in regard to both of the normal flow and the reverse flow, it is possible to intend to stabilize the flow arriving onto the detection element.

Figure 9:
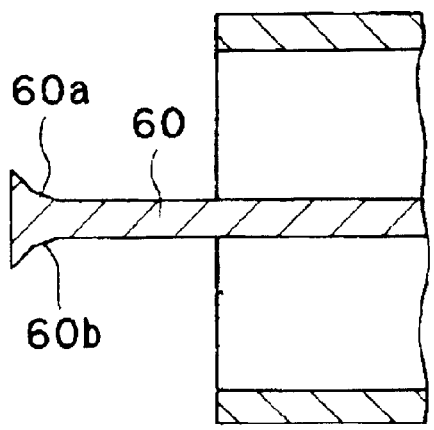
FIGS. 9(A) and (B) are partial views for explaining various Modification Examples of the measurement device of one embodiment of the invention, which has such an inlet plate protruding into the main pipe as shown in FIG. 4, wherein (A) and (B) show inlet plate end portions having respectively polygonal form and curved face form flow passage wall.
Figure 9:
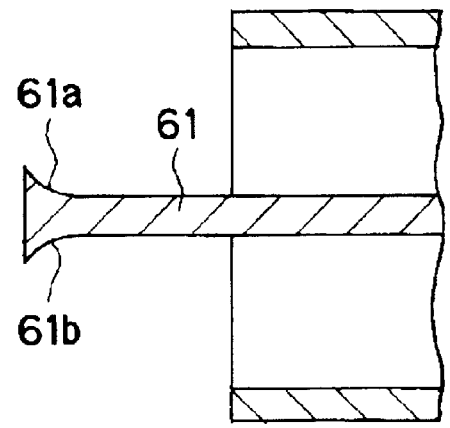

FIG. 9(A) and FIG. 9(B) are partial views for explaining various Modification Examples of the measurement device of the embodiment of the invention having such an inlet plate protruding into the main flow pipe as shown in FIG. 5.

Referring to FIG. 9(A), the end of an inlet plate 60 protruding into the main flow pipe from a top opening of the divided flow pipe is enlarged toward (along) the pipe axis direction (main flow direction) of the main flow pipe. And, flow passage faces 60a, 60b on both sides of this enlarged portion are formed in polygonal form.

Referring to FIG. 9(B), the end of an inlet plate 61 protruding into the main flow pipe from a top opening of the divided flow pipe is enlarged toward (along) the pipe axis direction (main flow direction) of the main flow pipe. And, flow passage faces 61a, 61b on both sides of this enlarged portion are formed in curved face form.

As shown in FIG. 9(A) and FIG. 9(B) in the above, by enlarging the end of the inlet plate, the measurement fluid is stably taken into the divided flow pipe and, further, the turbulence of the taken-in measurement fluid is reduced.

Figure 10:
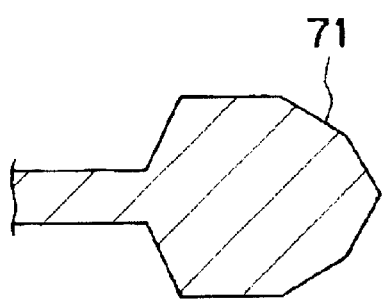
FIGS. 10(A) to (C) are partial views for explaining various Modification Examples of the measurement device of the Embodiment 1 of the invention, which has a Venturi opposite to a detection element, wherein (A), (B) and (C) show the Venturies having respectively polygonal form, curved face form and duplex curved face form flow passage wall.
Figure 10:
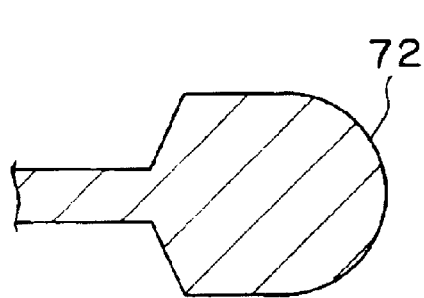
Figure 10:
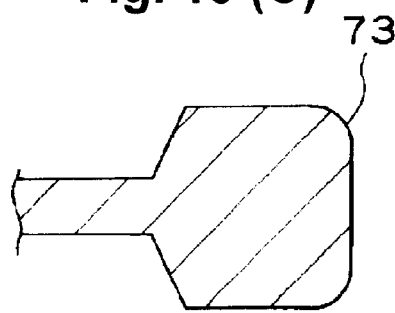

FIG. 10(A) to FIG. 10(C) are partial views for explaining various Modification Examples of the measurement device of the Embodiment 1 of the invention, which has the Venturi opposite to the detection element.

Referring to FIG. 10(A), a flow passage face 71 of the Venturi, which is formed in the other end of the inlet plate and opposite to the detection element, is formed in polygonal form. Referring to FIG. 10(B), a flow passage face 72 of this Venturi is formed in curved face form. Referring to FIG. 10(C), a flow passage face 73 of this Venturi is formed in duplex curved face form.

By the Venturi having such a flow passage face as shown in FIG. 10(A) to FIG. 10(C) in the above, the turbulence of the measurement fluid is suppressed from an upstream to a down stream of the detection element and, further, the down flow DW (refer to FIG. 1(B)) impinging obliquely toward the detection face of the detection element is stably generated.

According to the invention, there is provided the flow rate and flow velocity measurement device capable of, in regard to both of the normal flow and the reverse flow, performing measurements of the flow rate and the flow velocity stably and with a high accuracy. Further, by adding the bypass flow passage, the Venturi and the like to the divided flow pipe of the measurement device according to the invention, a further stabilized high accuracy measurement becomes possible in regard to both of the normal flow and the reverse flow and, further, it is possible to easily and quantitatively control the flow rate of the measurement fluid arriving on the detection face of the detection element. Further, according to the invention, by protruding/forming the one end of the inlet plate for forming the divided flow pipe passage of basically U-shape form into the main flow pipe, the top outer wall of the divided flow pipe becomes unnecessary, so that it is possible to simplify the structure of the divided flow pipe.

While the invention has been described in detail and with reference to specific embodiments thereof, it will be apparent to one skilled in the art that various changes and modifications can be made therein without departing from the spirit and scope thereof.

This application is based on Japanese Patent Application No. 2000-69259 filed Mar. 13, 2000, the disclosure of which is incorporated herein by reference in its entirety.

What is claimed is:

1. A flow measurement device having:
    a divided flow pipe which has a divided flow pipe passage curved in a substantially U-shape form, and into which a flow in a main flow pipe, which flow is the object of the measurement, is introduced; and
    a detection element which is disposed so as to be exposed to the flow in the divided flow pipe, and detects a quantity concerning the flow;
    characterized in that the divided flow pipe has a symmetrical flow passage structure with the detection element being made a center such that both of a normal flow flowing in a predetermined direction in the main flow pipe and a reverse flow flowing in a direction reverse to the normal flow can be equivalently detected.

2. The flow measurement device as claimed in claim 1, characterized by having flow control means which is provided in the divided flow pipe, and forms such a flow as obliquely impinges against a detection face of the detection element.

3. The flow measurement device as claimed in claim 2, characterized in that the flow control means includes protuberances formed on both sides of the detection element and protruding so as to throttle a pipe passage of the divided flow pipe.

4. The flow measurement device as claimed in claim 1, characterized by having an inlet port and an outlet port, which are formed respectively in outer periphery side both ends of the divided flow pipe, and open in a face approximately orthogonal to a flow direction in the main flow pipe.

5. The flow measurement device as claimed in claim 1, characterized in that
    an inlet plate forming the curved divided flow pipe passage is provided in the divided flow pipe; and
    at the end of the inlet plate opposite to the detection element there is formed a Venturi from upstream to downstream of the detection element and, by the Venturi, a flow passage width of the divided flow passage in which the detection element is disposed is made narrowest in the vicinity of a center of the detection element.

6. The flow measurement device as claimed in claim 5, characterized in that a flow passage face section shape of the Venturi formed on a face opposite to the detection element is any one of polygonal form, curved face form or duplex curved face form.

7. The flow measurement device as claimed in claim 1, characterized in that:
    an inlet plate forming the curved divided flow pipe passage is provided in the divided flow pipe; and
    a bypass flow passage short-circuiting between an inlet port and an outlet port of the divided flow pipe is formed between one end of the inlet plate and a top outer wall of the divided flow pipe.

8. The flow measurement device as claimed in claim 7, characterized in that:
    an orifice is provided in the bypass flow passage; and
    a flow rate of a measurement fluid toward the detection element is set by a protrusion amount of a flow passage wall forming the orifice or an orifice open area.

9. The flow measurement device as claimed in claim 8, characterized in that the flow passage wall forming the orifice is protruded toward a center of the orifice, and a section shape of a flow passage face of the protrusion portion is any one of polygonal form, curved face form and duplex curved face form.

10. The flow measurement device as claimed in claim 1, characterized in that:
    an inlet plate forming the curved divided flow pipe passage is provided in the divided flow pipe; and
    undulation portions are formed in the vicinity of the inlet port and the outlet port on the inlet plate, and by the undulation portions there are formed throttles in flow passages between the inlet port and the outer periphery side flow passage wall of the divided flow pipe and between the outlet port and the outer periphery side flow passage wall of the divided flow pipe, respectively.

11. The flow measurement device as claimed in claim 1, characterized in that:
    an inlet plate forming the curved divided flow pipe passage is provided in the divided flow pipe; and
    one end of the inlet plate protrudes into the main flow pipe while passing through a top opening of the divided flow pipe such that the flow in the main flow pipe is taken into the divided flow pipe passage.

12. The flow measurement device as claimed in claim 11, characterized in that in one end of the inlet plate there is formed an enlarged portion enlarging along a pipe axis direction of the main flow pipe.

13. The flow measurement device as claimed in claim 12, characterized in that a section shape of flow passage faces on both sides of the enlarged portion is any one of polygonal form, curved face form and duplex curved face form.

14. A flow measurement device having:
    a divided flow pipe into which a flow in a main flow pipe, which flow is the object of the measurement, is introduced;
    an inlet plate which extends in a direction substantially orthogonal to a flow direction in the main flow pipe, and forms a divided flow pipe passage curved in a substantially U-shape form in the divided flow pipe; and
    a detection element which is disposed so as to be exposed to the flow in the divided flow pipe, and detects a quantity concerning the flow;
    characterized in that:
    one end of the inlet plate protrudes into the main flow pipe while passing through a top opening of the divided flow pipe such that the flow in the main flow pipe is taken into the divided flow pipe passage; and
    the divided flow pipe has a symmetrical flow passage structure with the detection element being made a center.

15. The flow measurement device as claimed in claim 14, characterized in that in one end of the inlet plate there is formed an enlarged portion enlarging along a pipe axis direction of the main flow pipe.

16. The flow measurement device as claimed in claim 15, characterized in that a section shape of flow passage faces on both sides of the enlarged portion is any one of polygonal form, curved face form and duplex curved face form.

17. The flow measurement device as claimed in claim 1, characterized by being applied to an internal combustion engine mounted on a vehicle.

18. The flow measurement device as claimed in claim 14, characterized by being applied to an internal combustion engine mounted on a vehicle.

* * * * *